Dec. 11, 1928.
W. T. DEAN
1,694,772
LIQUID FUEL BURNING SYSTEM
Filed May 20, 1922    7 Sheets-Sheet 1

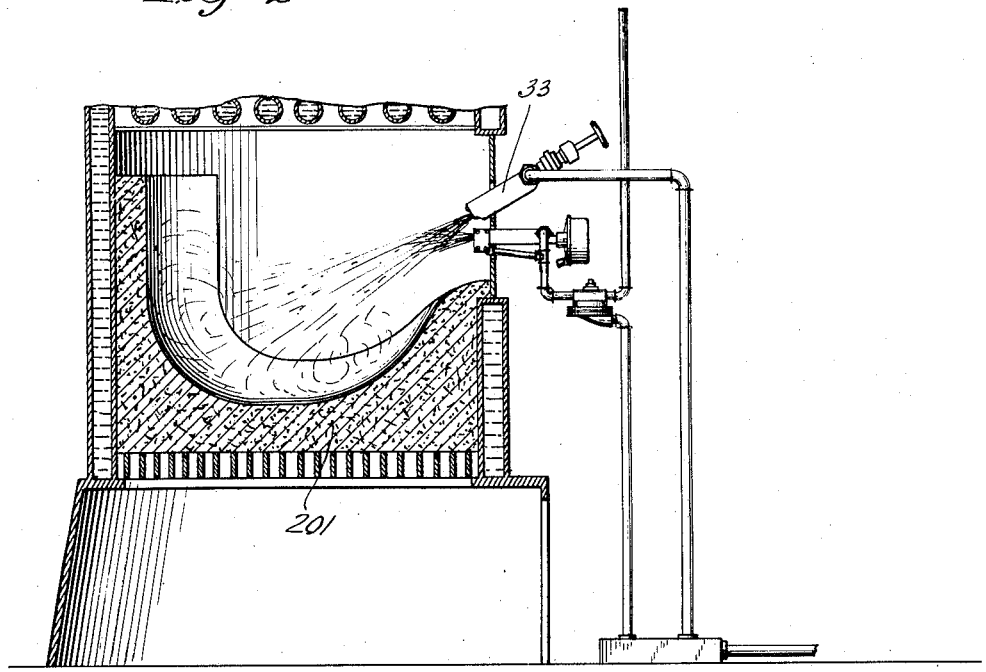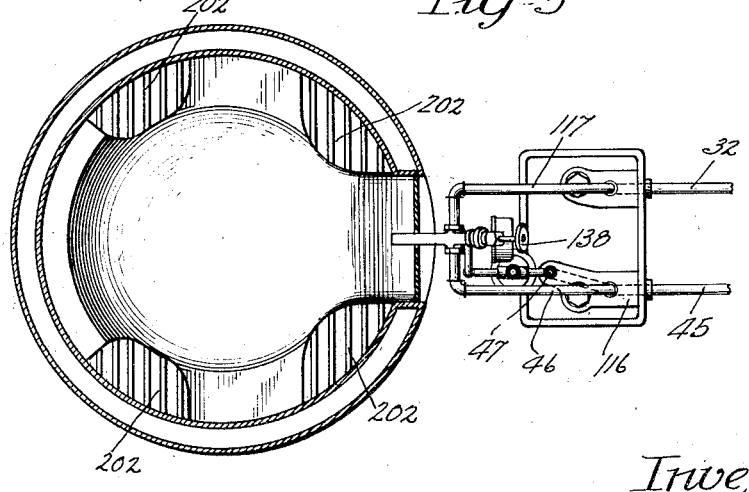

Dec. 11, 1928.
W. T. DEAN
1,694,772
LIQUID FUEL BURNING SYSTEM
Filed May 20, 1922      7 Sheets-Sheet 3
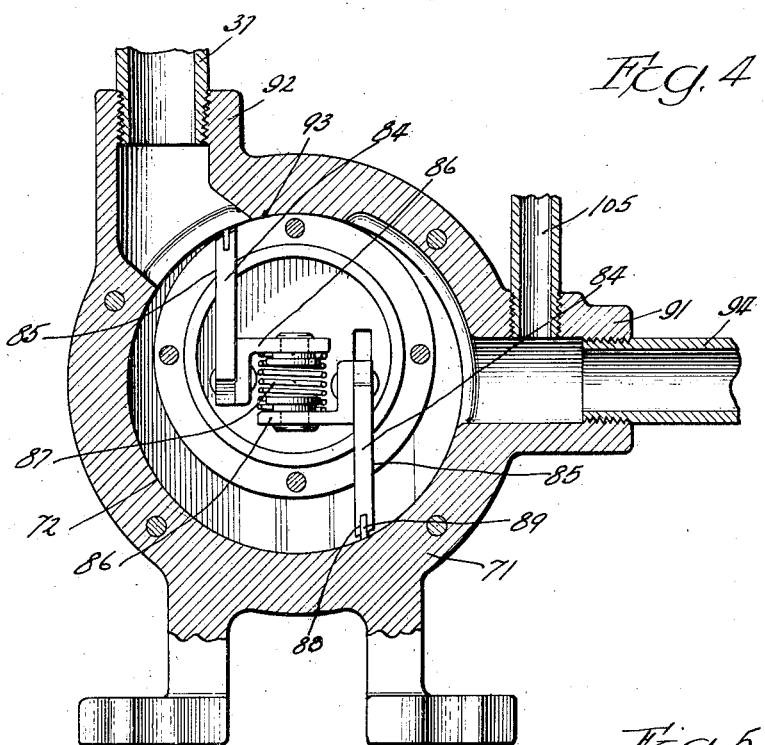
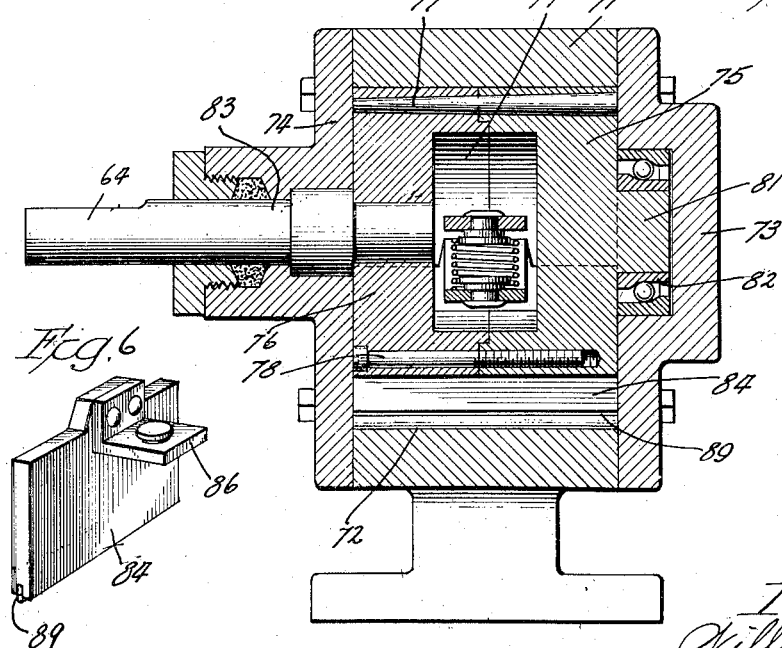
Inventor:
William T. Dean
By:- Munday, Clarke & Carpenter
Attys:-

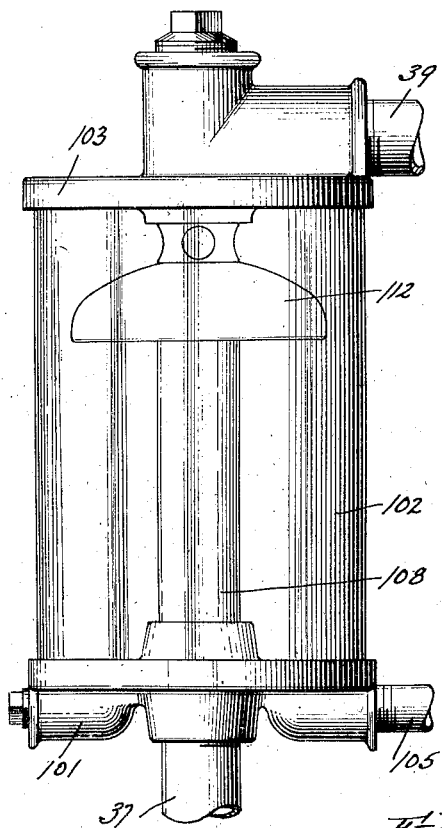
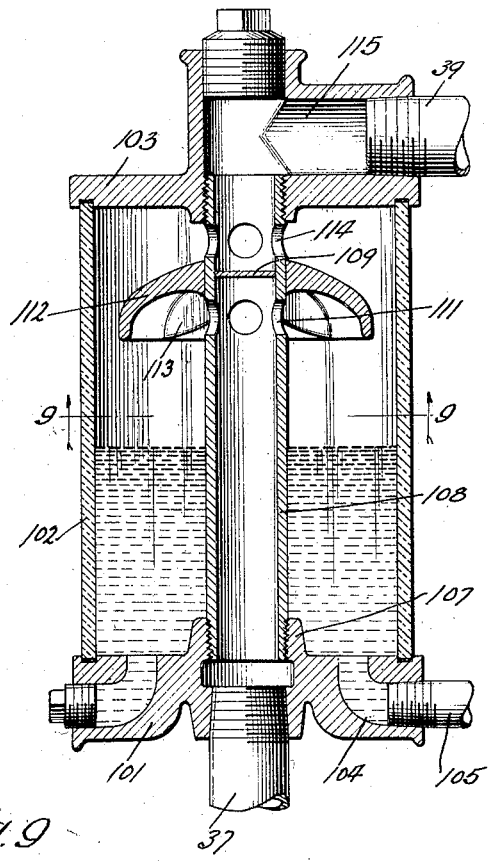
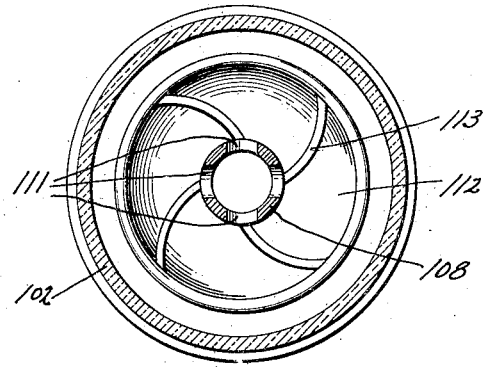

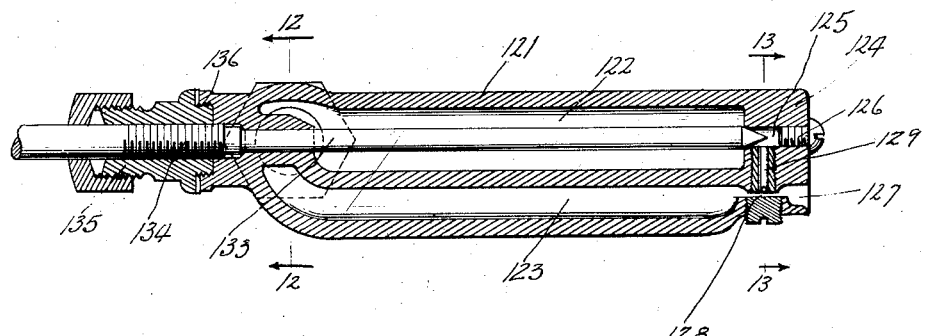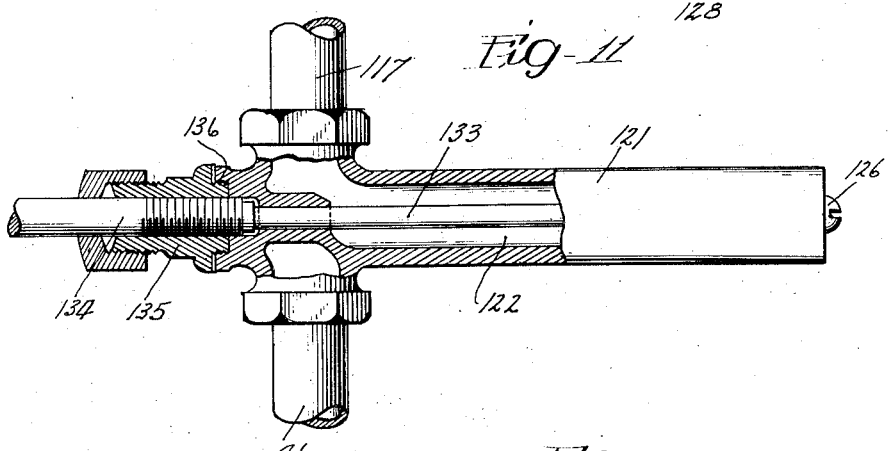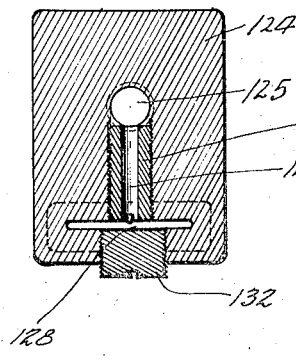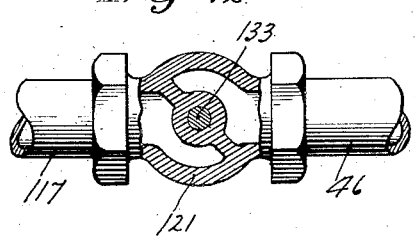

Dec. 11, 1928.
W. T. DEAN
1,694,772
LIQUID FUEL BURNING SYSTEM
Filed May 20, 1922     7 Sheets-Sheet 6
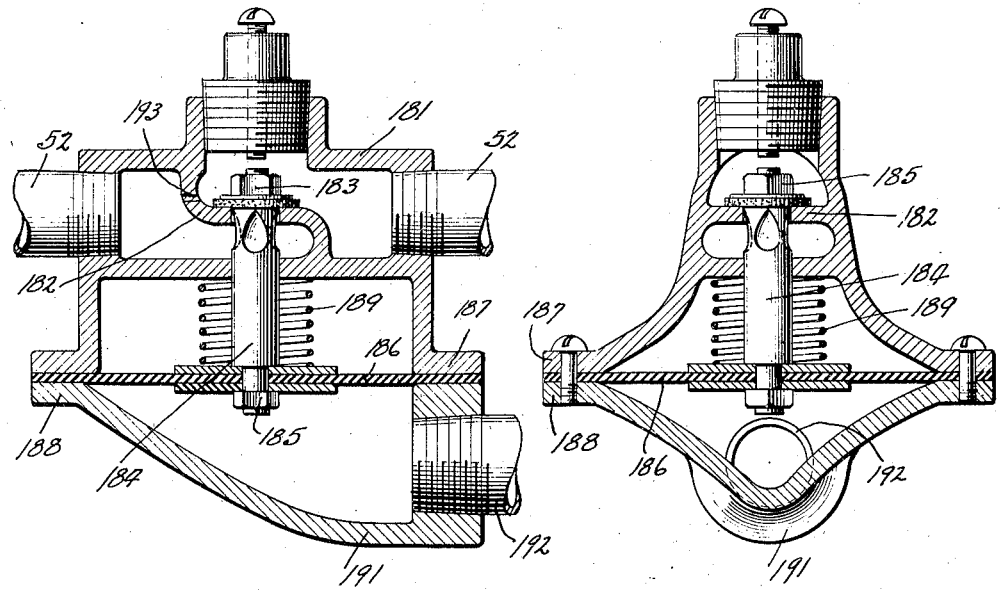
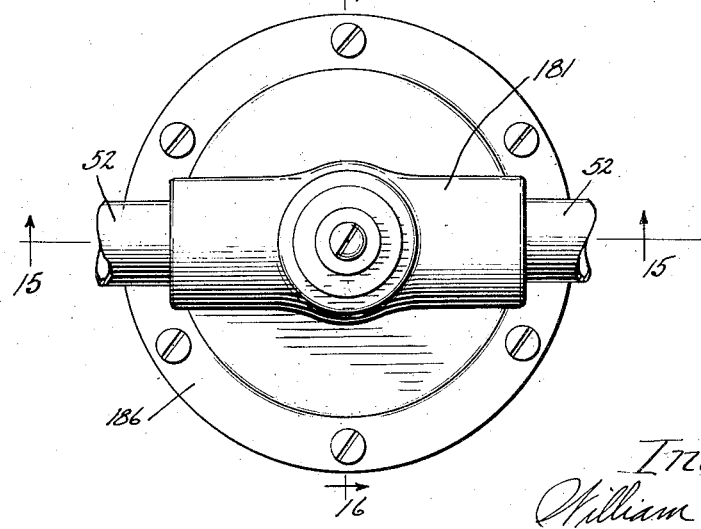

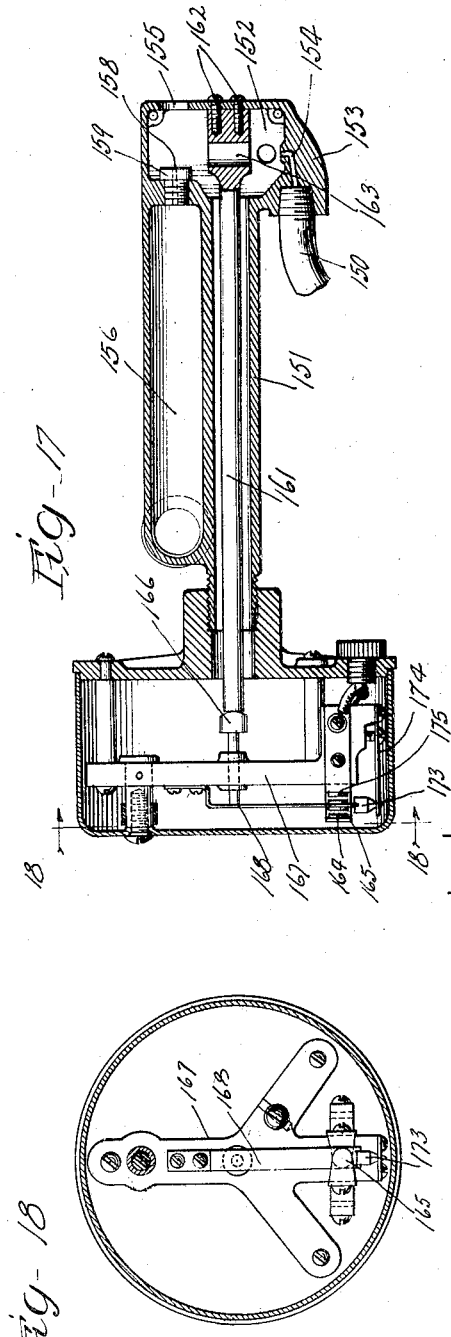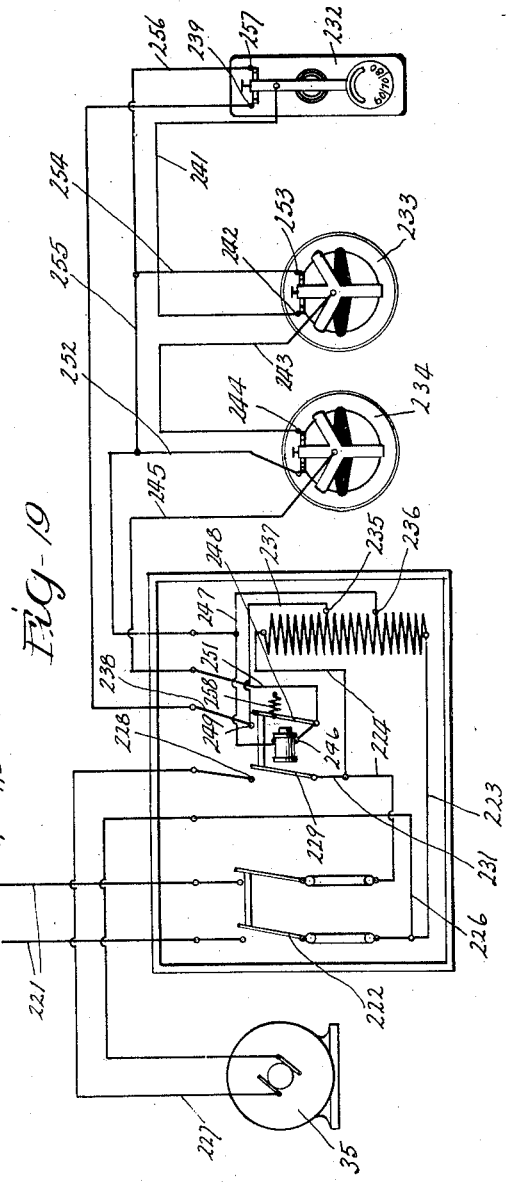

Patented Dec. 11, 1928.

1,694,772

UNITED STATES PATENT OFFICE.

WILLIAM T. DEAN, OF GLENCOE, ILLINOIS, ASSIGNOR, BY MESNE ASSIGNMENTS, TO JOHN R. BALL, OF MILWAUKEE, WISCONSIN.

LIQUID-FUEL-BURNING SYSTEM.

Application filed May 20, 1922. Serial No. 562,346.

This invention relates to liquid fuel heating systems, and has more particular reference to systems of this character adapted for use in the heating of buildings, a principal object of the invention being the provision of a simple heating system adapted for use in connection with the ordinary house heating plant primarily designed for the burning of coal.

An important object of the present invention is the provision of a system of the character described, which may be readily installed in connection with a house or building heating plant and without requiring expensive or extensive alterations in or additions to said heating plant.

Another important object of the invention is the provision of a system of the character described, which will insure complete and effective combustion of all the fuel supplied, and this without the necessity of appreciable incidental noise.

Another important object of the invention is the provision of a system of this character wherein provision is made for the complete combustion of any fuel dripping from the nozzle or burner after the flame has been extinguished.

Another important object of the invention is the provision of an apparatus which will economically and efficiently operate with fuel of extremely low test and of cheap grade and character.

Another important object of the invention is the provision of a system or apparatus of the character described wherein the moving parts are reduced to a minimum, and the provision of a peculiarly effective system of lubrication therefor.

Another important object of the invention is the provision of a complete and accurately operating control for such a system or apparatus, which will inherently provide against operation of the apparatus under all unsafe conditions and under conditions likely to result in damage to the apparatus or to the heating plant itself.

The foregoing are merely a few of the more general objects and purposes, there being a considerable number of other objects, as for example, the insurance of durability and efficient action of all of the several parts and devices entering into the complete system, the invention having broadly in contemplation the effecting of maximum economy in the construction of the apparatus and its parts, the consumption of fuel, gas and lubricating oil, and through the provision of maximum durability of the parts and the reduction of the necessity for frequent repair, replacement and readjustment. The invention contemplates an apparatus of wholly automatic action, requiring only the supply of fuel at remotely recurring occasions.

The numerous other objects and advantages of the invention will be apparent as it is better understood from the following description, which, taken in connection with the accompanying drawings, discloses a preferred embodiment thereof.

Referring to the drawings,

Fig. 2 is an enlarged partial section taken vertically through the bottom of the furnace, boiler or like part of a usual coal burning heating plant as arranged and equipped in accordance with my invention;

Fig. 3 is a section taken horizontally through the same and above the fire-pot;

Fig. 4 is a transverse sectional view through the blower or air compressor;

Fig. 5 is a similar view taken at right angles to the view shown in Fig. 4;

Fig. 6 is a perspective view of one of the rotor blades;

Fig. 7 is a side elevation of the oil reservoir;

Fig. 8 is a vertical section through the same;

Fig. 9 is a section taken substantially on the line 9—9 of Fig. 8;

Fig. 10 is a vertical section taken through the oil burning nozzle or burner;

Fig. 11 is a similar view, partly in section and partly in plan;

Fig. 12 is a section taken substantially on the line 12—12 of Fig. 10;

Fig. 13 is a section taken substantially on the line 13—13 of Fig. 10;

Fig. 14 is a top plan view of the gas valve control;

Fig. 15 is a section taken substantially on the line 15—15 of Fig. 14;

Fig. 16 is a section taken substantially on the line 16—16 of Fig. 14;

Fig. 17 is a longitudinal vertical view of the igniter nozzle;

Fig. 18 is a section taken substantially on the line 18—18 of Fig. 17; and

Fig. 19 is a diagrammatic view of the electric wiring and thermostatic arrangement.

Figure 1:
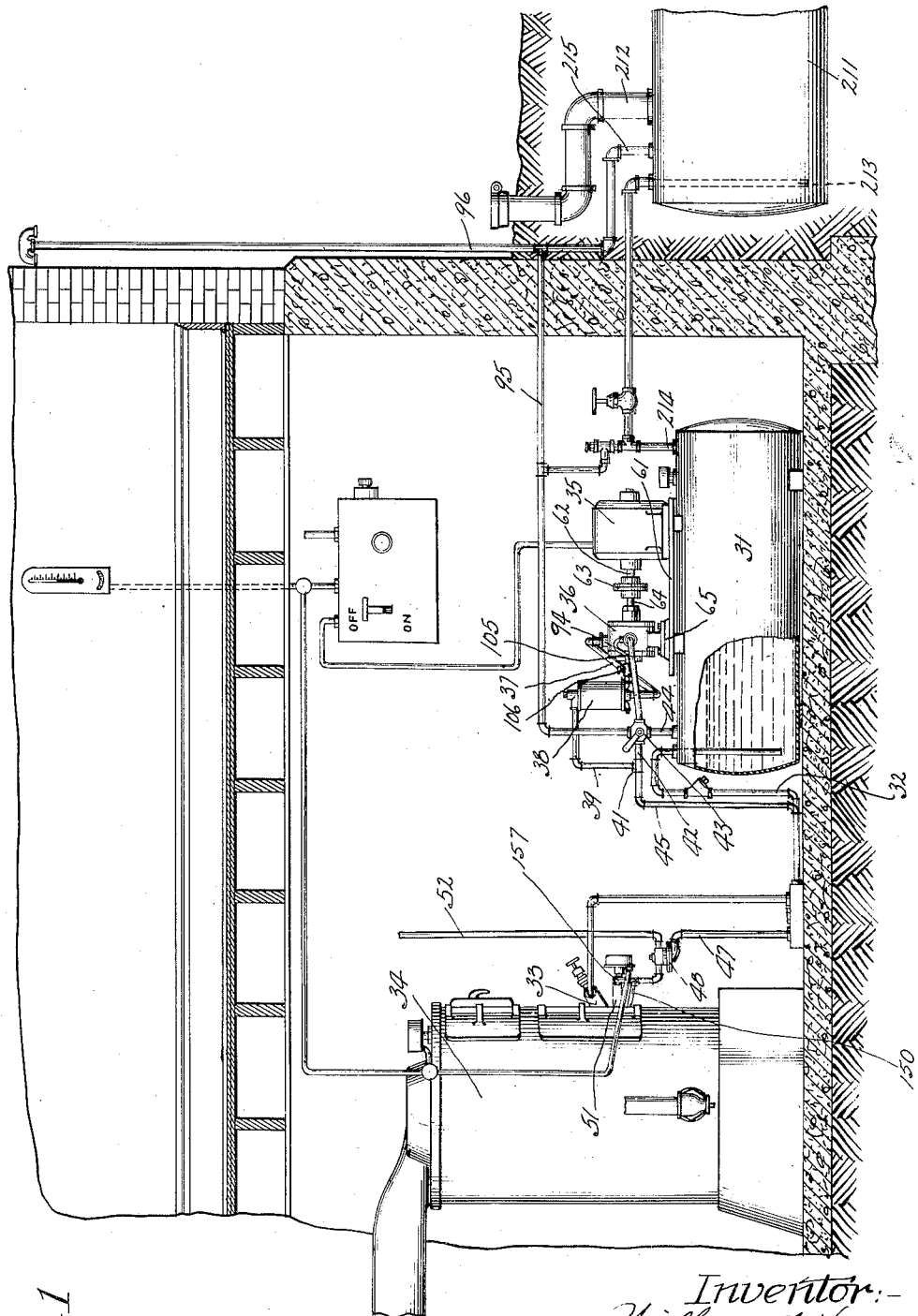
Figure 1 is a side elevation of a system embodying my present invention, certain portions and parts of the apparatus being shown more or less schematically.

The complete system shown on the drawing as the preferred embodiment of my present invention, comprises a service tank 31 for containing the fuel. A fuel or oil pipe 32 leads to a nozzle 33 arranged in the boiler, furnace or other like apparatus 34 of the ordinary house heating plant. An electric motor 35 drives an air blower or compressor 36 which drives the air through a pipe 37 through a blower lubricating apparatus 38 and from this through a pipe 39 to a T-union 41. Here the air under pressure is diverted through pipe 42, valve 43 and pipe 44 into the tank 31, and through piping 45, 46 to the nozzle 33. A third branch 47 (from pipe 45) leads to the gas control valve mechanism 48 for the igniter nozzle 51. Illuminating or other igniter gas is supplied through piping 52 past the valve controlled by mechanism 48 to the igniter nozzle.

The foregoing parts and devices will all be hereinafter more completely described. It is believed that it should be stated, however, at this point that a relatively small blower or compressor 36 supplies the fuel to the fuel burner 33 under pressure and that attention should be called to the circumstance that this blower or air compressor also supplies air under substantially like pressure to the nozzle or burner 33 for atomizing the fuel as it leaves said burner.

A detail description of the above-mentioned parts and other parts of the apparatus or system will now be undertaken. The motor 35 may have any usual or preferred construction and in the present instance is mounted upon a platform or base 61 arranged for convenience upon the tank 31. This motor rotates the shaft 62, which is connected by a coupling 63 with the shaft 64 of the blower or air compressor. The air compressor is preferably mounted at 65 upon the base or platform 61.

The details of construction of the blower are best shown in Figs. 4 to 6. Referring to these figures, reference character 71 indicates a body casting having a central opening providing an internal cylindrical wall 72. The body casting is open at its sides and these openings are adapted to be closed by side plates 73 and 74. The body casting and the side plates constitute a stator within which is eccentrically mounted a blade carrying rotor. This rotor comprises a body of two members 75 and 76, joined together by centering pins 77 and machine screws 78. Each of the members 75 and 76 is hollowed out to provide a central cavity 79. The rotor body member 75 is provided with a stub shaft or boss 81 adapted to be mounted in anti-friction bearings 82 in the side plates 73, and the member 76 is fixed on the end of shaft 64 which has bearing at 83 in the side plate 74. Two blades 84 are provided and these are mounted in slots 85 arranged in parallelism with the diameter of the rotor and at opposite sides thereof. The blades 84 are adapted to reciprocate or slide in these slots to follow the contour of the face 72 of the stator as the rotor is rotated by the shaft 64, this reciprocation occurring because of the eccentric mounting of the rotor within the stator as may be observed from the drawing. Each blade is provided with an arm 86 extending in across the diameter with which the blades are parallel, and a spring 87 is mounted between the arms 86 and this spring urges the blades apart, maintaining them in contact with the stator face 72. It will be noted that there is relatively little extension and contraction of this spring since the blades move in and out without substantial change in their relative positions.

In the present instance I provide a slot 88 in the operative edge of each blade and in this slot I provide an inset or member 89 of some material readily wearing into full contact with the stator face 72, and of a nature that will prevent its adhering to the stator wall should the supply of lubricant be permitted to become exhausted. Fiber is excellent material for the construction of these insets.

A boss 91 is formed at one side of the stator for the admission of air and a second boss 92 is located well around the circumference for its exit. The point of contact 93 between the rotor and the stator is of course located in the minor arc between this inlet and outlet. In the present instance I have arranged for the taking of air from without the building and to this end a pipe 94 leads to valve 43 and there communicates with a pipe 95 in turn connected with a pipe 96 outside the building. The outlet pipe is the pipe 37, already mentioned as connected with the lubricator 38.

Referring now to Figs. 7, 8, and 9 this lubricator comprises a reservoir formed by a bottom 101 fixed on the upturned end of pipe 37, a cylindrical wall 102 and a top closure 103. The bottom 101 is provided with an outlet 104 in communication with a pipe 105 containing a valve 106 and communicating at its opposite end through boss 91 and into the stream of air sucked into the air compressor. A steady stream of lubricating oil from the reservoir passes through the pipe 105 and into the air compressor. This lubricating oil is picked up by the air moving through the air compressor and by this air is carried back into the oil reservoir.

The bottom 101 of the oil reservoir is provided with a boss 107 into which is screwed an upstanding pipe 108 in free communication with the pipe 37. A partition 109 is provided in this pipe near its top and well above the oil level. Below the partition a number of air outlet openings 111 are formed so that the oil laden air is diverted outwardly above the oil in the reservoir. A hood 112 is mounted on the pipe 108 above these openings 111 and this hood is provided with internal curved ribs or webs 113 to give the air a whirly movement as it passes out of the pipe 108. Egress openings 114 are formed in the pipe 108 above the partition and the air leaves the reservoir, going back into the pipe 108 through these openings. The upper end of the pipe 108 is screwed into the cap or top closure 103 of the reservoir and this cap has a laterally extending pass 115 communicating with the pipe 108 at one end and with pipe 39 at the other. The air in passing up around the hood may and does occupy a larger area or path of travel and on this account is rendered momentarily relatively quiescent. The hood and its webs catch some of the oil carried by the air as the air leaves the openings 111 and the remainder of the lubricating oil may drop down, due to the quiescent condition about the hood.

The air stream leaving the lubricator through the pipe 39 flows, for the most part, through pipe 45 but establishes a fuel flowing pressure upon the fuel in the tank through the pipe 42, valve 43 and pipe 44. The air flows from pipe 45 into a base 116 and into pipe 46 to the fuel burner or nozzle 33. The fuel flows from pipe 32, which extends down into the fuel in the tank, to base 116 and from base 116 by pipe 117 to the nozzle 33. This nozzle is shown in detail in Figs. 10 to 13. It comprises a body 121, having a chamber 122 for fuel and a passage or chamber 123 for air. The fuel chamber 122 extends lengthwise of the nozzle to a normally closed end 124 through which however, is an opening 125 closed by a plug 126. The air passage communicates with the pipe 46 and is located beneath the chamber 122. It has a flame opening 127 in the end 124 and just inwardly of this flame opening is restricted at 128 so that the air will have maximum velocity at this point. A confined pass 129 extends down from the opening 125 to the restricted part 128 of the passage and the fuel is fed into the air through the opening 125 and pass or opening 129 above-mentioned. I preferably provide the opening 129 in a threaded plug 131 adapted to be inserted and removed through an opening just therebelow and closed by a plug 132. A valve 133 is arranged lengthwise of the chamber 122 and has an operative end preferably of the needle type for controlling the opening 125. This valve has threaded engagement at 134 in a sleeve 135 threaded at 136 into the valve body and a hand disk or knob 138 is provided on its outer end.

A gas flame is employed to ignite the oil as it leaves the nozzle with the air under pressure, this air under pressure insuring its atomization or at least its division into drops or particles of sufficient fineness to insure complete combustion.

The igniter nozzle or burner 51 is located just below the fuel burner or nozzle 33 so that the streams of oil and air on the one hand and gas and air on the other have an acute angle intersection causing them to commingle and move on together intermingled, as shown in Fig. 2. The construction of the igniter nozzle is shown in detail in Fig. 17. Referring to this figure, reference character 151 indicates the nozzle body. This is provided with a pilot chamber 152 at its end adjacent the combustion point. A boss 153 is provided beneath the chamber 152 and a pilot branch pipe 150 from pipe 52 is secured therein in communication with a passage 154 to the pilot chamber. A flame opening 155, i. e. an opening for the exit of the combustible mixture is provided at the top of the pilot chamber. A passage 156 is provided in the nozzle for the igniter gas and this is connected with a pipe 157, in turn connected to pipe 52, which in turn is connected at the base 116 with the pipe 45. The gas leaves the passage 156 through a port 158 in a plug 159, registering with opening 155.

The apparatus includes an electric control, which will be described in detail hereinafter, and which includes a thermostat closely associated with this igniter nozzle and which is adapted to prevent any supply of fuel should the pilot light be extinguished. This thermostat comprises a rod or member 161 which is extended across the pilot light chamber 152 and fastened in place by screws 162 to the nozzle casing. This rod is provided with a head in the pilot light chamber, in which is formed an opening 163 within which the pilot light burns. So long as the rod is heated by the pilot light the electrical contacts 164 and 165 are maintained in engagement. The rod is expansible longitudinally and bears against a plunger 166 at its end remote from the pilot light chamber 152. The plunger 166 is mounted in a base or body plate 167 of the thermostat and in engagement with a leaf spring 168 carrying the movable contact 165. This leaf or spring member 168 has a head 173 bearing upon a second spring 174 that prevents its stopping in a central position, causing it to be moved one side or the other of its central position and into contact with contact 164 or a second contact 175. These contacts and their relation to the general wiring will be more fully explained later. The spring 168 has a set to cause it to follow the expansion and contraction of the member 161.

Arrangement is made in the apparatus shown on the drawing for supplying a relatively large volume of igniter gas while and only while fuel is delivered to the fuel burner and for supplying merely sufficient igniter gas to maintain a pilot when the burner is not in action. The means for accomplishing this is best shown in Figs. 14 to 16. A casing 181 is mounted in the pipe 52 and this casing contains a valve partition seat 182 adapted to be closed by a valve 183. The stem 184 of this valve is attached at 185 to a diaphragm 186 held between a flange 187 at the bottom of the casing and a companion flange 188 of an air chamber. A spring 189 normally presses this diaphragm to hold the valve to its seat. The air chamber is formed by the diaphragm at the top and a lower wall 191 formed integral with the flange 188. Provision is made in the wall 191 to receive a pipe 192 from pipe 47. When air is compressed by the compressor or blower and fuel and air under pressure delivered to the burner nozzle this pressure is communicated to the diaphragm and the valve lifted, with resultant delivery of a necessary volume of gas for the igniter flame. A bleed or by-pass 193 is provided through the valve seat 182 to maintain the pilot light when the valve is closed. It may be mentioned that sufficient air enters through the opening 155 to maintain this pilot light when the igniter flame is not burning.

The burners or nozzles 33 and 51 may be inserted or directed into the fire-box of any ordinary heating plant primarily constructed and adapted for the burning of coal. I prefer to provide in such fire-box or in the ash-pit beneath it a bottom of refractory material of peculiar shape and arrangement. This is shown in Fig. 2 at 201. This bottom extends up at the front, back and sides to provide a surface curved in all directions and this surface acts to disperse the flame from the burners. The bottom 201 is preferably of sufficient thickness to permit it to receive and retain a considerable quantity of heat and is preferably so arranged that the flame plays directly upon it. Thus constructed and arranged the presented surface or part of the bottom soon becomes highly heated and should any drops of fuel fall from the nozzle upon extinguishment of the flame, the refractory bottom causes immediate and complete combustion. Openings 202 are arranged at intervals near the sides and front and bottom to admit air of combustion through the usual draft openings of the heating plant, for it is my intention to supply merely a small percentage of the air used in the burning of the fuel from the blower.

Referring now to Fig. 1, reference character 211 indicates a large reservoir or tank for the storing of the supply of fuel. This is preferably buried in the ground outside the building, and a receiving pipe 212 provided to permit its filling. A pipe 213 extends down into it and over into the top of the tank 31 at 214. A vent pipe 215 is arranged in the top of the reservoir 211 and communicates with pipe 96. When it is desired to transfer fuel from the reservoir 211 to the tank 31 it is only necessary to shift the valve 43 and start the motor. The valve 43 is of the usual two-pass type, i. e. a four-way valve. When in the position shown in Fig. 1 it establishes communication between pipes 42 and 44 on the one hand and pipes 94 and 95 on the other. This is the normal arrangement. When, however, it is desired to fill the tank 31 the valve is given a quarter turn and communication is established between the pipes 44 and 94, and 42 and 95. If the blower is now actuated pressure is removed from the top of the tank 31 and the fuel transferred by suction.

A control is provided which starts the heating action when the temperature of the room falls below a predetermined degree, and if, and only if, the pilot light is lighted. This control insures the termination of the heating action when the temperature of the room reaches the desired degree and when, and if, the heating plant is overtaxed to a dangerous amount whether or not the degree of heat demanded in the room is satisfied. Three thermostats are used,—one the main control from a room to be heated; another governed by the conditions of the plant itself; and the third by the presence or absence of a pilot flame. A starting circuit for the motor includes these three thermostats in series and for this circuit to be completed it is necessary that more heat be demanded, the pilot light be lit and the conditions at the furnace or boiler or plant be within the range of intended operation. As soon as this starting circuit is completed a maintenance circuit is established that does not permit the passing of current through any of the thermostats. The heating action is stopped by a separate circuit, completed by one or the other of the thermostats, and in this circuit the thermostats are arranged in multiple or parallel. This circuit, like the starting circuit, is immediately destroyed so that in every instance when change of conditions produces thermostatic action no current is, prior thereto, flowing through the thermostat controlling. Because of this circumstance there is never provided the necessity for separating thermostatic contacts while current is flowing through them and all arcing and sparking which tend to wear the contacts and prevent their accuracy and delicacy of operation are eliminated.

The wiring diagram is shown in Fig. 19. Reference character 221 indicates line wires which may be considered a source of electric energy. A switch 222 is provided in these wires or leads to cut off the entire apparatus from possibility of action and this switch is normally closed. These wires run through connections 223 and 224 to the primary coil 225 of a transformer if alternating current be used, or to the resistance coil of a potentiometer if direct current be used. A wire 226 leads from connection 223 to one side of motor 35 and a wire 227 leads from the other side of the motor to a switch contact 228. A movable blade 229 of this switch is connected by wire connection 231 with wire 224. Reference character 232 indicates the room thermostat. Reference character 233 indicates the boiler or furnace thermostat and reference character 234 the pilot light thermostat, already described. The boiler thermostat 233 permits the establishment of a starting circuit while contact is made on its cold side; while the pilot light thermostat 234 permits the establishment of a starting circuit when contact is made on its hot side. The room thermostat 232, of course, permits the establishment of the starting circuit when contact is made on its cold side.

Reference character 235 indicates one terminal and reference character 236 the other terminal of the circuit of lesser potential at the transfomer or potentiometer.

Tracing the starting circuit from terminal 235, a wire 237 leads to a wire 238 to contact 239 on the cold side of thermostat 232. A wire 241 leads from thermostat 232 to cold terminal 242 of thermostat 233. A wire 243 leads to hot terminal 244 of thermostat 234. From this thermostat a wire 245 leads to a relay 246, from this a wire 247 leads to terminal 236. This is the starting circuit, and as soon as it is established switch 229 is brought into contact with contact 228 and the motor started into operation. At the same time, a switch 248 is brought into contact with a contact 249. This establishes a maintenance circuit for holding the relay 246 in energized condition. This circuit may be traced as follows: contact 235, wire 237, switch 248, relay 246, and wire 247 to contact 236. This circuit is in effect a short circuit across the starting circuit and cuts out from active participation the three thermostats.

The maintenance circuit causes continued operation of the motor until a stopping circuit is established by one or the other of the thermostats. In this circuit the three thermostats are arranged in multiple and each is capable of independent action. This circuit is completed when the room thermostat 232 or the furnace thermostat 233 makes contact on the hot side, or when the pilot thermostat makes contact on the cold side (this might occur upon failure of gas supply). This circuit may be traced as follows: terminal 235, wire 237, switch 248, a wire 251, wire 245, wire 252 from cold side of thermostat 234 (if 234 be cold), and wire 247 to terminal 236. If thermostat 233 shows too highly heated conditions at the furnace the circuit is as follows: terminal 235, wire 237, switch 248, wire 251, wire 243, hot terminal 253, wire 254, wire 255, and wire 252, wire 247 and terminal 236. When the room becomes of a temperature rendering stopping of the apparatus desirable the circuit is as follows: terminal 235, wire 237, switch 248, wire 251, wire 245, wire 243, wire 241, wire 256 from hot terminal 257 of thermostat 232, wire 255, 247, and terminal 236.

The effect of the establishment of any one of these three circuits is to destroy the maintenance circuit by short circuiting around the relay 246, with the result that the switches 229 and 228 are immediately pulled open by a spring 258. It is to be noted in this connection that the opening of these switches cuts off all current through the thermostats so that when conditions require a change of thermostatic contact to start the apparatus or prevent its subsequent starting no contacts through which current is flowing are separated.

The description of the embodiment of the invention selected as the one at present preferred and shown on the drawing, is of a complete system. It will, however, be understood that numerous features of invention hereinbefore disclosed are capable of use in other connections and it is the intention and desire to protect them, both individually and in their relations to each other.

It is thought that the invention and many of its attendant advantages will be understood from the foregoing without further description, and it will be obvious that various changes in the construction and the arrangement of the parts may be provided without departing from the spirit and scope of the invention or sacrificing all of its material advantages, the form of the invention hereinbefore described being merely a preferred embodiment.

I claim:

The combination with the heating plant of a building, of an oil burning nozzle inserted therein, a supply tank outside the building, a service tank inside the building, a source of air under pressure associated with the latter tank, pipe connections from said source to said nozzle and said tanks and from said source to the atmosphere exterior of said building, and a valve for controlling said connections, said valve when in one position connecting said source with the atmosphere through said last-named connection and with said nozzle and said service tank whereby to feed oil and air to said nozzle under pressure, and said valve when in another position closing said first-named connections and connecting said source to said service tank and the connection communicating with the atmosphere exterior of the building for reverse operation whereby air is drawn from the service tank and exhausted into the atmosphere, causing fuel to be drawn from said supply tank into the service tank.

WILLIAM T. DEAN.